(No Model.) 2 Sheets—Sheet 1.
D. H. VALENTINE.
BALANCING FRAME FOR BICYCLES.
No. 576,385. Patented Feb. 2, 1897.
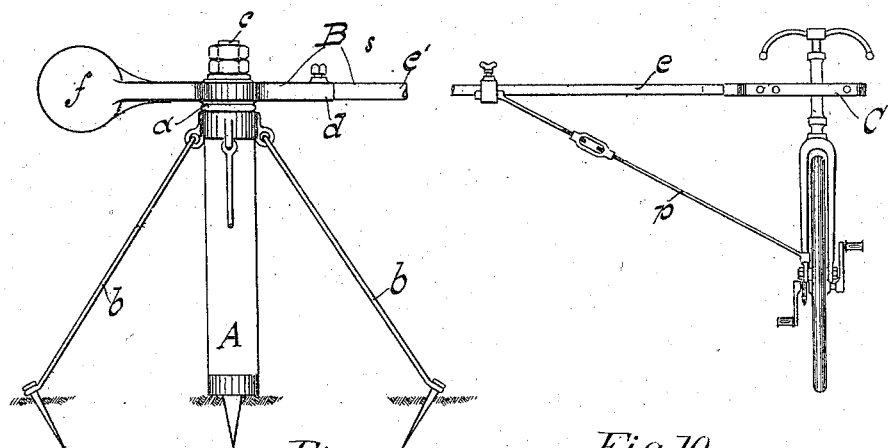
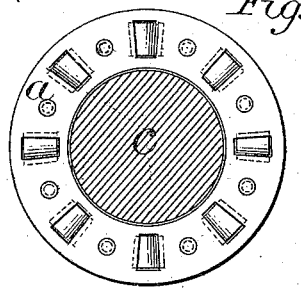
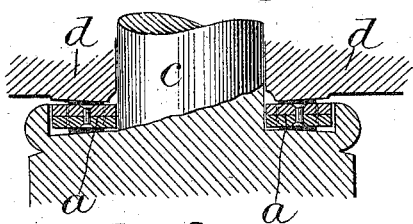
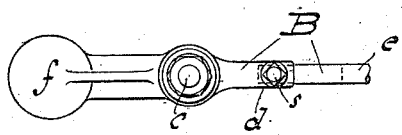
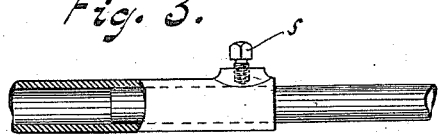
Witnesses
A. W. King
E. C. Hulson
David H. Valentine, Inventor
By Schreiter & Van Iderstine
his Attorneys.

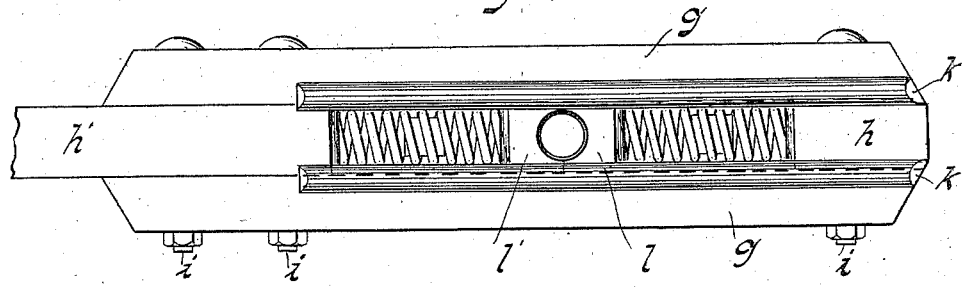
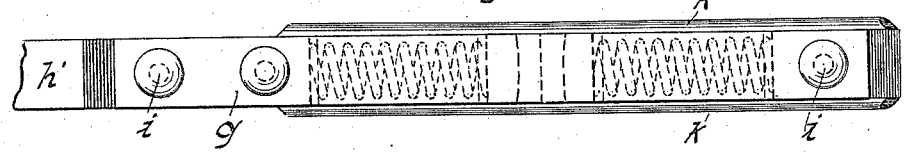
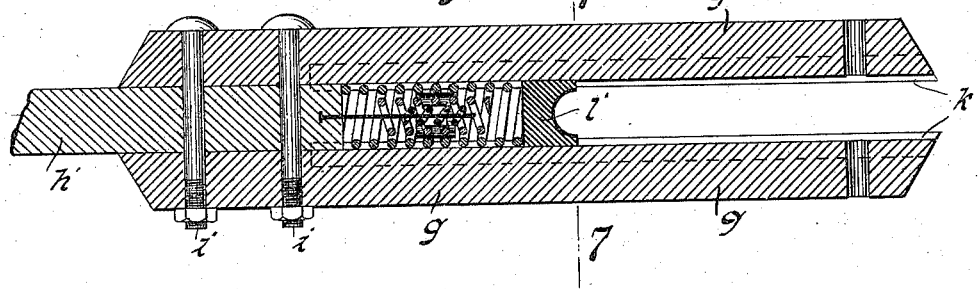
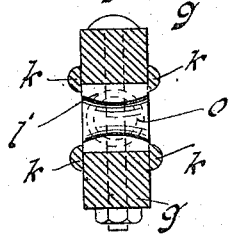
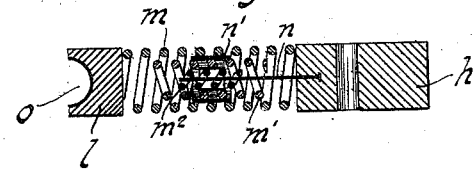

UNITED STATES PATENT OFFICE.

DAVID H. VALENTINE, OF BROOKLYN, NEW YORK.

BALANCING-FRAME FOR BICYCLES.

SPECIFICATION forming part of Letters Patent No. 576,385, dated February 2, 1897.

Application filed July 21, 1896. Serial No. 600,028. (No model.)

*To all whom it may concern:*

Be it known that I, DAVID H. VALENTINE, of the city of Brooklyn, county of Kings, and State of New York, have invented certain new and useful Improvements in Balancing-Frames for Bicycle-Riders, of which the following is a full, clear, and exact specification, reference being had to the accompanying drawings, wherein—

Figure 1 is a front elevation; Fig. 2, a top view of my improved frame for bicycles. Fig. 3 is an enlarged detail showing the connection between the parts of the balancing-bar. Fig. 4 is a top view. Fig. 5 is a side elevation; Fig. 6, a horizontal section of the reciprocating clamp, one jaw and block being removed. Fig. 7 is a sectional view of the clamp on lines 7 7 indicated in Fig. 6. Fig. 8 is a horizontal sectional view of the clamping-jaw and block removed in Fig. 6. Fig. 9 is a top view, and Fig. 10 a cross-section, of the roller-bearing set between the top of the standard and the butt.

Similar letters of reference indicate corresponding parts in all views of the drawings.

My invention relates to appliances for bicycle-schools; and it consists of a frame for sustaining in balanced position the bicycle of a rider learning the pedaling motion and unable as yet to maintain his equilibrium.

Beginners in riding bicycles experience the greatest difficulty in maintaining their equilibrium while performing the motion necessary to propel the bicycle. In learning to ride the tyro is usually supported by an attendant on foot. This, however, seriously interferes with his progress on the bicycle, besides preventing him from exercising at a proper speed. On the other hand no apparatus has been yet devised for this purpose, permitting the rider to propel his bicycle freely and at the same time holding the bicycle and rider in a balanced position.

The balancing-frame, which is the object of my invention, consists of a post A, set in the ground and supported by braces $b$ in vertical position, balancing-bar B, turnably secured to the post on pivot $c$, and clamp C, secured to the end of the bar.

Balancing-bar B is constructed of telescopic tubes $e$ $e'$, &c., secured together and to the butt $d$ by set-screws $s$. Butt $d$, slid on pivot $c$ and turning on bearing $a$, extends beyond the post A, and on its outer end is added weight $f$ to balance bar B in horizontal position. The butt $d$ being necessarily heavy and also the pressure of the weight $f$ and of the teloscopic tube $e$ $e'$, &c., concentrated on the bearing-surface of the standard A, I insert there the roller-bearing $a$, consisting of conical antifriction-rollers pillowed in slots provided in two flat rings riveted together. The slots are slightly wider than the diameter of the rollers on the joined sides of the rings, but narrower on the opposite sides. Thus when the two rings are riveted together the conical rollers are inclosed and held between them.

Clamp C, secured to the bar B and adapted to hold the fork-stem of a bicycle below the handle-bar, is peculiarly constructed to allow the bicycle a moderate deviation from vertical position and yet to hold it firmly in any position it may assume. At the same time the springs used in the clamp compensate for deviations caused by the instability of the rider and assist him in returning to balanced position.

Clamp C consists of the two longitudinal bars $g$ and $g'$, with strips $k$ flanging their inner edges, and of blocks $h$ and $h'$, screwed together with the bars $g$ and $g'$ by bolts $i$. In place of block $h'$ the end of rod $e$ may be squared and set between the bars $g$ and $g'$. In that case the bolts $i$ would at the same time secure clamp C to bar B. In the frame thus composed and snugly fitted between flanges $k$ are set jaws $l$ and $l'$, having semicircular notches $o$, preferably lined with rubber to prevent injury to the smoothly-finished fork-stem of the bicycle. Jaws $l$ and $l'$ are pressed together by recoiling springs $m$, set between them and blocks $h$ and $h'$, respectively. Each of these recoiling springs is composed of three springs $m$ $m'$ $m^2$, of different diameters and lengths, slid one in another to increase their resistance and recoiling power proportionately with the strain exerted on the jaws by the efforts of the rider, tending to force the bicycle from its balanced position. By such compounding of the springs the grip of the clamps is made also more yielding within a certain limit of deviation and to resist a greater deviation with a greater force.

Springs $m$ are connected to blocks $h$ and $h'$ and to jaws $l$ and $l'$, respectively, whereas springs $m^2$ are supported on pins $n$, as shown in Fig. 8, and springs $m'$ are held in position by bushings $n'$.

During the first lessons, when the strain produced by the instability of the rider of the bicycle will be very great, a brace $p$, as shown in Fig. 1, may be used. This bar, however, will seldom be necessary, because the hold of the clamp of the frame is sufficient to meet any ordinary strain.

Rod $e$ is preferably constructed of steel tubing. Butt $d$ may be cast of malleable iron or steel and in one piece with the weight $f$. It may also be produced of wrought-iron and a cast-iron weight secured thereto. Post A may be made of a piece of timber in the manner as shown in the drawings, or a standard of cast-iron with a base-plate adapted to be screwed to the floor may be substituted therefor.

The frame of the clamp C may be produced of hard wood or cast of some light metallic alloy of sufficient tensile strength. Jaws $l$ and $l'$ are cast of suitable metal and lined with rubber.

In reducing my invention to practice I do not confine myself to the particular construction and shape of the parts as herein shown and described, this construction showing only one practical embodiment of the principle of my invention.

I claim as my invention and desire to secure by Letters Patent—

1. In a balancing-frame for bicycles, the combination with a supporting-frame, comprising a standard, secured in vertical position, a pivot, set in the top of the standard, a weighted butt set on the pivot, roller-bearings supporting the butt, and an extensible bar, secured to the butt, of a clamp secured to the extensible bar and having jaws adapted to hold the fork-stem of a bicycle, and of means for elastically pressing the jaws together.

2. A clamp for securing the fork-stem of a bicycle to a balancing-bar, consisting of a frame composed of two bars, flanged on their inner sides and of blocks set one on each end between the bars with bolts passing through the bars and through the blocks and holding the frame together; of jaws, snugly fitted to slide in the flanges between the bars and having semicircular notches lined with rubber, recoiling springs, composed of several spiral springs of different lengths and diameters, slid one in another and held by bushings and pins in relative positions between the blocks and the jaws, pressing the jaws together, and reacting against deviations of the fork-stem caused by the instability of the rider, thereby assisting him to regain a balanced position.

3. In a balancing-frame for bicycles the combination with balanced extensible bar, rotatably secured to a standard, of a clamp, consisting of a longitudinal frame, jaws, having semicircular notches adapted to hold the fork-stem of the bicycle, snugly fitted in the frame and adapted to slide therein, and of recoiling springs, composed of several spiral springs of different lengths and diameters, slid one in another, set in the frame to press the jaws together, and reacting against deviations of the fork-stem caused by the instability of the rider, thereby assisting him to regain a balanced position.

4. In a clamp for securing the fork-stem of a bicycle to a balancing-frame, the combination with gripping-jaws, sliding between flanged bars, of compounded recoil-springs, set behind the gripping-jaws and consisting of several springs of different lengths and diameters slid one in another, the springs rendering the grip of the jaws more yielding within certain limit and increasing the resistance of the clamp in proportion to the strain tending to dislocate the bicycle, thus clamped, from balanced position.

In witness that I claim the improvements described in the foregoing specification I have signed my name in the presence of two subscribing witnesses.

D. H. VALENTINE.

Witnesses:
A. W. KURZ,
HENRY SCHREITER.